United States Patent
Wang et al.

(10) Patent No.: US 12,003,898 B2
(45) Date of Patent: Jun. 4, 2024

(54) PROJECTOR AND PROJECTION METHOD

(71) Applicant: Coretronic Corporation, Hsin-Chu (TW)

(72) Inventors: Chun-Chieh Wang, Hsin-Chu (TW); Fan-Chieh Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 3 days.

(21) Appl. No.: 17/954,328

(22) Filed: Sep. 28, 2022

(65) Prior Publication Data
US 2023/0102878 A1 Mar. 30, 2023

(30) Foreign Application Priority Data
Sep. 29, 2021 (CN) .......................... 202111149544.0

(51) Int. Cl.
*H04N 9/31* (2006.01)
*G01S 7/4865* (2020.01)
(Continued)

(52) U.S. Cl.
CPC ......... *H04N 9/3185* (2013.01); *G01S 7/4865* (2013.01); *G01S 7/4915* (2013.01);
(Continued)

(58) Field of Classification Search
CPC .... H04N 9/3185; H04N 9/3147; H04N 9/317; G01S 7/4865; G01S 7/4915; G01S 17/08;
(Continued)

(56) References Cited

U.S. PATENT DOCUMENTS

| 5,070,401 A * | 12/1991 | Salvati ...................... G06T 7/60 702/159 |
| 6,877,863 B2 * | 4/2005 | Wood ................... H04N 9/3185 353/42 |

(Continued)

FOREIGN PATENT DOCUMENTS

| CN | 104062831 | 9/2014 |
| CN | 106101675 | 11/2016 |

(Continued)

OTHER PUBLICATIONS

"Office Action of China Counterpart Application", issued on Apr. 10, 2024, pp. 1-21.

*Primary Examiner* — Brian P Yenke
(74) *Attorney, Agent, or Firm* — JCIPRNET (57) ABSTRACT

A projector and a projection method are provided. The projector includes a control device, a projection optical engine, a distance sensing device, and an image capturing device. The projection optical engine projects a first projection image to a projection surface according to first image data. The distance sensing device senses multiple distance parameters of a projection area. The image capturing device captures the first projection image to obtain a first captured image. The control device performs a keystone correction operation and a leveling correction operation on the first image data. The projection optical engine projects a second projection image to the projection surface according to the corrected first image data. The control device obtains a second captured image including the second projection image through the image capturing device, and analyzes the second captured image to project current projection image size information in the second projection image.

20 Claims, 5 Drawing Sheets

(51) Int. Cl.
    *G01S 7/4915*     (2020.01)
    *G01S 17/08*     (2006.01)
    *G01S 17/89*     (2020.01)
    *G06T 5/80*     (2024.01)
    *G06T 7/60*     (2017.01)
    *G06T 7/80*     (2017.01)
    *G06V 10/24*     (2022.01)
    *G06V 30/16*     (2022.01)

(52) U.S. Cl.
    CPC .............. *G01S 17/08* (2013.01); *G01S 17/89* (2013.01); *G06T 5/80* (2024.01); *G06T 7/60* (2013.01); *G06V 10/247* (2022.01); *G06V 30/1607* (2022.01); *H04N 9/3147* (2013.01); *H04N 9/317* (2013.01)

(58) Field of Classification Search
    CPC .. G01S 17/89; G06T 7/60; G06T 5/80; G06V 10/247; G06V 30/1607
    See application file for complete search history.

(56) References Cited

U.S. PATENT DOCUMENTS

| | | | | |
|---|---|---|---|---|
| 7,125,122 B2* | 10/2006 | Li | ............................ | H04N 5/74 353/121 |
| 8,322,863 B1* | 12/2012 | Cho | ..................... | H04N 9/3185 353/70 |
| 8,398,246 B2* | 3/2013 | Rutledge | .............. | H04N 9/3185 353/69 |
| 9,071,751 B2* | 6/2015 | Higashimoto | ....... | H04N 23/698 |
| 9,749,605 B2* | 8/2017 | Liu | ...................... | H04N 9/3185 |
| 9,762,871 B2* | 9/2017 | De La Cruz | ......... | H04N 9/3185 |
| 9,872,010 B2* | 1/2018 | Tran | ...................... | G06T 19/006 |
| 10,027,937 B1* | 7/2018 | Staton | .................. | H04N 9/3185 |
| 10,051,251 B2* | 8/2018 | Brown | ................ | H04N 9/3185 |
| 10,074,191 B1* | 9/2018 | Reome | .................... | G01S 17/87 |
| 10,080,002 B2* | 9/2018 | Kasuga | ................ | G06K 7/1095 |
| 10,663,844 B2* | 5/2020 | Urano | .................. | H04N 9/3182 |
| 10,904,501 B2* | 1/2021 | Wu | .......................... | H04N 9/317 |
| 11,336,878 B2* | 5/2022 | Yoon | .......................... | G06T 5/80 |
| 11,451,688 B2* | 9/2022 | Benemann | ........... | H04N 23/689 |
| 11,528,460 B2* | 12/2022 | Chen | ..................... | H04N 9/3185 |
| 2005/0041045 A1* | 2/2005 | Plut | .......................... | G06F 9/451 345/660 |
| 2007/0058136 A1* | 3/2007 | Sakai | ...................... | G03B 21/26 353/34 |
| 2009/0115915 A1* | 5/2009 | Steinberg | ............. | H04N 9/3194 353/121 |
| 2010/0315601 A1* | 12/2010 | Furui | .................... | H04N 9/3194 353/121 |
| 2013/0063401 A1* | 3/2013 | Ouchida | .............. | H04N 9/3179 345/175 |
| 2014/0043225 A1* | 2/2014 | Lai | ............................ | G06T 3/40 345/156 |
| 2014/0267427 A1* | 9/2014 | Hasegawa | ............ | H04N 9/3185 345/647 |
| 2016/0188195 A1* | 6/2016 | Chen | ......................... | G06T 5/80 715/765 |
| 2017/0090730 A1* | 3/2017 | Knodt | .................. | G06F 3/04845 |
| 2017/0280120 A1* | 9/2017 | Lai | ......................... | H04N 9/3194 |
| 2017/0374331 A1* | 12/2017 | Liu | ........................ | G03B 21/53 |
| 2018/0120560 A1* | 5/2018 | Wang | ..................... | G02B 27/40 |
| 2018/0125340 A1* | 5/2018 | Ishikawa | ............ | A61B 1/00194 |
| 2019/0327457 A1* | 10/2019 | Urano | ................... | H04N 9/3194 |
| 2021/0364900 A1* | 11/2021 | Hsien | ................. | G03B 21/2066 |
| 2022/0038668 A1* | 2/2022 | Tsui | ....................... | G06T 7/194 |
| 2022/0286654 A1* | 9/2022 | Zhong | .................. | H04N 9/3185 |
| 2022/0295026 A1* | 9/2022 | Wu | .......................... | G01S 17/08 |
| 2022/0385867 A1* | 12/2022 | Kim | ..................... | H04N 9/3185 |
| 2023/0037686 A1* | 2/2023 | Choi | ..................... | H04N 9/3173 |
| 2023/0230210 A1* | 7/2023 | Powell | ................... | H04N 25/61 348/14.01 |
| 2023/0260434 A1* | 8/2023 | Kim | ................... | G03B 21/2053 345/207 |
| 2023/0362339 A1* | 11/2023 | Chen | ...................... | H04N 9/3194 |
| 2024/0015272 A1* | 1/2024 | Park | ........................ | H04N 9/31 |

FOREIGN PATENT DOCUMENTS

| | | |
|---|---|---|
| CN | 107454373 | 12/2017 |
| CN | 108141561 | 6/2018 |
| CN | 112415841 | 2/2021 |
| CN | 112422939 | 2/2021 |
| CN | 113395498 | 9/2021 |

\* cited by examiner

PROJECTOR AND PROJECTION METHOD

CROSS-REFERENCE TO RELATED APPLICATION

This application claims the priority benefit of China application serial no. 202111149544.0, filed on Sep. 29, 2021. The entirety of the above-mentioned patent application is hereby incorporated by reference herein and made a part of this specification.

BACKGROUND

Technical Field

The invention relates to a display device and a display method, and particularly relates to a projector and a projection method applied to the projector.

Description of Related Art

Regarding a conventional projector, a projection image may have keystone distortion or the projection image may be out of focus due to that a placement position of the projector is shifted relative to a projection surface, and even a part of the content of the projection image may be distorted or shifted due to that the projection surface is in an uneven state. Particularly, if the projector is an ultra-short throw projector, a slight distance error between the projector and the projection surface may cause huge distortion and deformation of the projection image, and therefore a user cannot view a correct projection image.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projector and a projection method adapted to provide a good projection effect.

Other objects and advantages of the invention may be further illustrated by the technical features broadly embodied and described as follows.

In order to achieve one or a portion of or all of the objects or other objects, an embodiment of the invention provides a projector including a control device, a projection optical engine, a distance sensing device, and an image capturing device. The control device is configured to output first image data. The projection optical engine is coupled to the control device, and is configured to receive the first image data to project a first projection image to a projection surface according to the first image data. The distance sensing device is coupled to the control device, and is configured to sense a plurality of distance parameters of a projection area. The first projection image is displayed in the projection area. The image capturing device is coupled to the control device, and is configured to capture the first projection image to obtain a first captured image. The control device performs at least one of a keystone correction operation and a leveling correction operation on the first image data according to at least one of the plurality of distance parameters and the first captured image. The projection optical engine projects a second projection image to the projection surface according to corrected first image data. The control device obtains a second captured image including the second projection image through the image capturing device, and analyzes the second captured image to project current projection image size information in the second projection image.

In an embodiment of the invention, the control device includes an image processor and a microcontroller. The image processor is coupled to the projection optical engine. The microcontroller is coupled to the distance sensing device, the image capturing device, and the image processor, and is configured to generate a correction signal according to at least one of the distance parameters and the first captured image, and output the correction signal to the image processor, and the image processor performs the keystone correction operation and the leveling correction operation on the first image data according to the correction signal.

In an embodiment of the invention, the microcontroller is further configured to analyze the second captured image to generate the current projection image size information, the control device outputs the current projection image size information to the projection optical engine, and the projection optical engine displays the current projection image size information in the second projection image.

In an embodiment of the invention, the keystone correction operation includes performing keystone correction on the first image data in at least one of a horizontal direction and a vertical direction.

In an embodiment of the invention, the control device obtains at least one of a first inclination angle in the vertical direction and a second inclination angle in the horizontal direction between the projector and the projection surface according to at least one of the distance parameters and the first captured image, and performs the keystone correction operation on the first image data according to at least one of the first inclination angle and the second inclination angle.

In an embodiment of the invention, a sensing range of the distance sensing device on the projection surface covers the projection area, and the control device determines whether the projection surface is even in the projection area according to the distance parameters, so as to determine whether to perform the leveling correction operation on the first image data.

In an embodiment of the invention, the distance sensing device includes an infrared light source and at least one time of flight ranging sensor. The infrared light source is coupled to the control device and is configured to emit a plurality of infrared rays toward at least one image area of the first projection image on the projection surface. The at least one time of flight ranging sensor is coupled to the control device for sensing a plurality of reflected infrared rays reflected by the projection surface to output the distance parameters to the control device.

In an embodiment of the invention, the control device is further configured to determine whether the second projection image is clear to output focal length correction data to the projection optical engine, and the projection optical engine automatically adjusts a focal length.

In an embodiment of the invention, the projector is an ultra-short throw projector.

The invention provides a projection method including following steps. First image data is output by a control device; the first image data is received by a projection optical engine to project a first projection image to a projection surface according to the first image data; a plurality of distance parameters of a projection area are sensed by a distance sensing device; a first captured image is obtained by an image capturing device according to the first projection image captured by an image capturing device; at least one of a keystone correction operation and a leveling correction operation is performed on the first image data by the control device according to at least one of the plurality of distance parameters and the first captured image; a second projection image is projected to the projection surface by the projection optical engine according to corrected first image data; and a second captured image including the second projection image is obtained by the control device through the image capturing device, and the second captured image is analyzed to project current projection image size information in the second projection image.

Based on the above description, the projector and the projection method of the invention may automatically perform keystone correction and leveling correction on the projection image, and may also automatically detect a size of the current projection image, so as to display the projection image size information in the projection image.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Moreover, electrical connection means that signals may be transmitted between two components.

Figure 1:
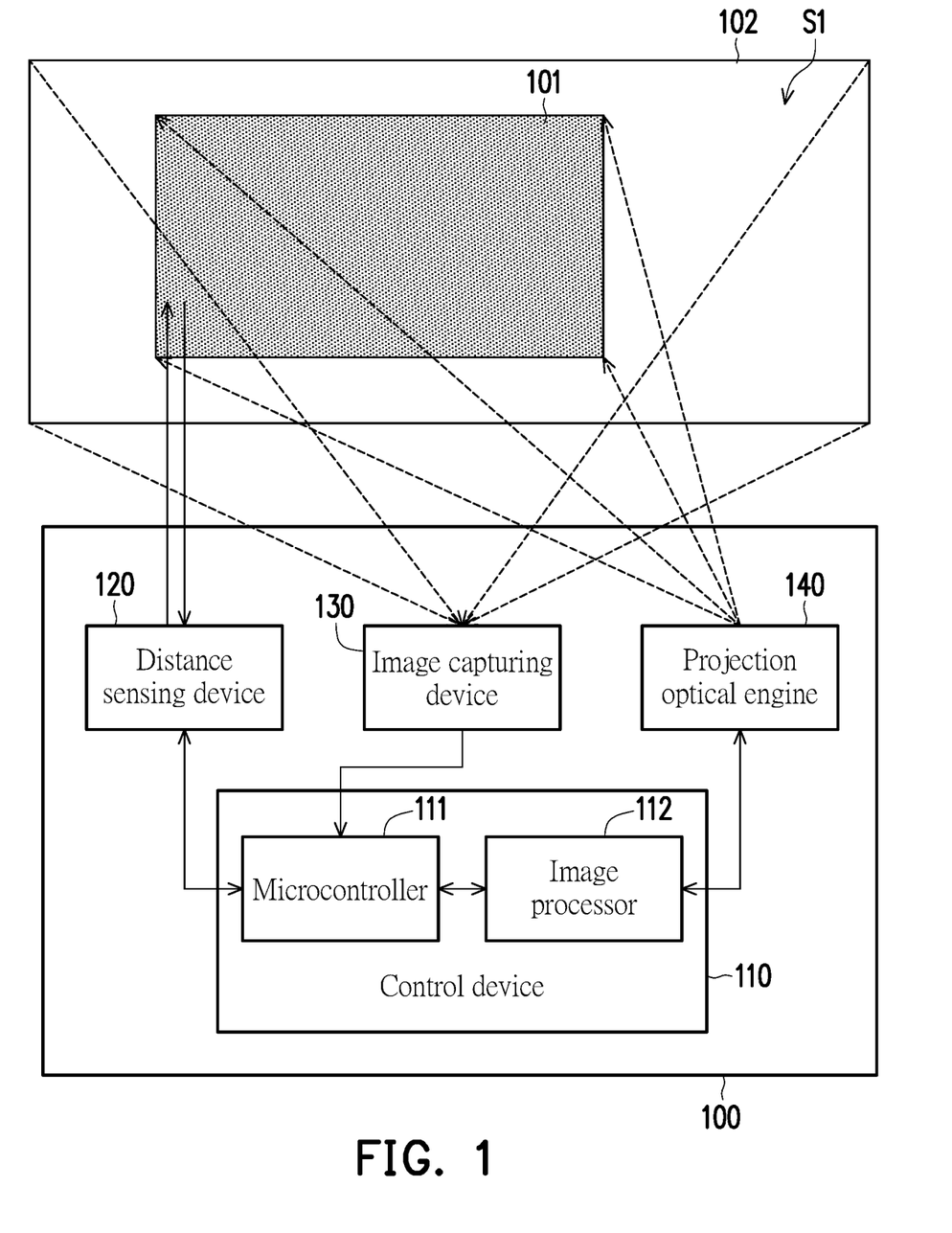
FIG. 1 is a schematic diagram of a projector according to an embodiment of the invention.

FIG. 1 is a schematic diagram of a projector according to an embodiment of the invention. Referring to FIG. 1, a projector 100 includes a control device 110, a distance sensing device 120, an image capturing device 130, and a projection optical engine 140. The control device 110 is coupled (electrically connected to) the distance sensing device 120, the image capturing device 130 and the projection optical engine 140. In the embodiment, the control device 110 drives the projection optical engine 140. The control device 110 includes a microcontroller 111 and an image processor 112. The microcontroller 111 is respectively coupled to the distance sensing device 120, the image capturing device 130, and the image processor 112. The image processor 112 is coupled to the projection optical engine 140. In the embodiment, the microcontroller 111 may drive the projection optical engine 140 through the image processor 112, so that the projection optical engine 140 may project a first projection image 101 toward a projection surface S1. Then, the distance sensing device 120 may sense a plurality of distance parameters (distance values) of a projection area. The projection area is an area where the projection optical engine 140 projects images, the first projection image 101 is displayed in the projection area, and a size of the first projection image 101 is the same as a size of the projection area. In the other embodiment, the size of the first projection image 101 may be smaller than the size of the projection area. The distance sensor 120 senses a plurality of distance parameters in the projection area projected by the projection optical engine 140. The image capturing device 130 has an image capturing range 102, and the image capturing range 102 is larger than the projection area. The image capturing device 130 may perform an image capturing operation to capture the first projection image 101 on the projection surface S1 to obtain a first captured image. More specifically, the image capturing device 130 generates the first captured image according to the first projection image 101 captured by the image capturing device 130. In the embodiment, the microcontroller 111 may generate a correction signal according to at least one of the plurality of distance parameters and the first captured image, and may output the correction signal to the image processor 112, and the image processor 112 may correct image data of the first projection image 101 according to the correction signal. Therefore, the projector 100 of the embodiment may implement an automatic image correction function. In the embodiment, the automatic image correction may include at least one of keystone correction and leveling correction.

In the embodiment, the projection surface S1 may be parallel to a plane formed by extending a first direction D1 and a third direction D3. The first direction D1 and a second direction D2 may be respectively a first horizontal direction and a second horizontal direction. The third direction D3 may be a vertical direction. The first direction D1, the second direction D2, and the third direction D3 may be perpendicular to each other. The projector 100 may be, for example, placed on a plane formed by extending the first direction D1 and the second direction D2.

In the embodiment, the microcontroller (MCU) 111 and the image processor 112 may respectively include a central processing unit (CPU) related to a data calculation function and an image processing function, or other programmable general-purpose or special-purpose microprocessor, a digital signal processor (DSP), an image processing unit (IPU), a graphics processing unit (GPU), a programmable controller, an application specific integrated circuits (ASIC), a programmable logic device (PLD), other similar control devices, or a combination of these devices.

In the embodiment, the control device 110 may also include a memory, where the memory may be, for example, a removable random access memory (RAM), a read-only memory (ROM), or a flash memory, or a similar component or a combination of the above components. The memory may be used to store related image data, keystone correction module, leveling correction module, projection image size analysis module, etc., that may be used to implement related programs and algorithms of the invention, and may be accessed and executed by the microcontroller 111 and the image processor 112.

In the embodiment, the distance sensing device 120 faces the projection surface S1. The distance sensing device 120 may include a time of flight (ToF) ranging sensor and a sensing light source. The sensing light source emits a sensing light beam, and the ToF ranging sensor may obtain distance information, such as a distance between the projector 100 and the projection surface S1, by determining a time difference between an emission time of the sensing light beam and a time of receiving the reflected sensing light beam. For example, the distance sensing device 120 may include an infrared light source and at least one ToF ranging sensor. The infrared light source may be coupled to the microcontroller 111 of the control device 110 and used to emit a plurality of infrared rays to the projection area of the first projection image 101 on the projection surface S1. The at least one ToF ranging sensor may be coupled to the microcontroller 111 of the control device 110 for sensing a plurality of reflected infrared rays reflected by the projection surface S1, so as to output a plurality of distance parameters to the microcontroller 111 of the control device 110. However, the distance sensing device 120 of the invention is not limited to the above device type. In other embodiments of the invention, the distance sensing device 120 may be, for example, a proximity sensor, an ultrasonic sensor, or a similar non-contact distance sensor.

In the embodiment, the image capturing device 130 may be a camera, and may be used to capture an image of the projection surface S1, where the image capturing range 102 of the image capturing device 130 on the projection surface S1 102 may be larger than the first projection image 101 (the projection area).

In the embodiment, the projection optical engine 140 may include a projection light source, an optical engine, and an optical system. The projection light source may include a light emitting unit such as a discharge bulb, a light emitting diode, or a laser light source. The optical engine may include a reflective spatial light modulation device or a transmissive spatial light modulation device. The reflective spatial light modulation device may, for example, include reflective liquid crystal on silicon (LCOS) or a digital micro-mirror device (DMD). The transmissive spatial light modulation device may, for example, include a transparent liquid crystal panel. The optical system may include a plurality of lenses, and the plurality of lenses may be arranged on a path of a light beam for transmitting the light beam.

It should be noted that the projector 100 of the embodiment may be an ultra short throw projector, but the invention is not limited thereto. The projector 100 of the embodiment may also be adapted to other types of projectors.

Figure 2:
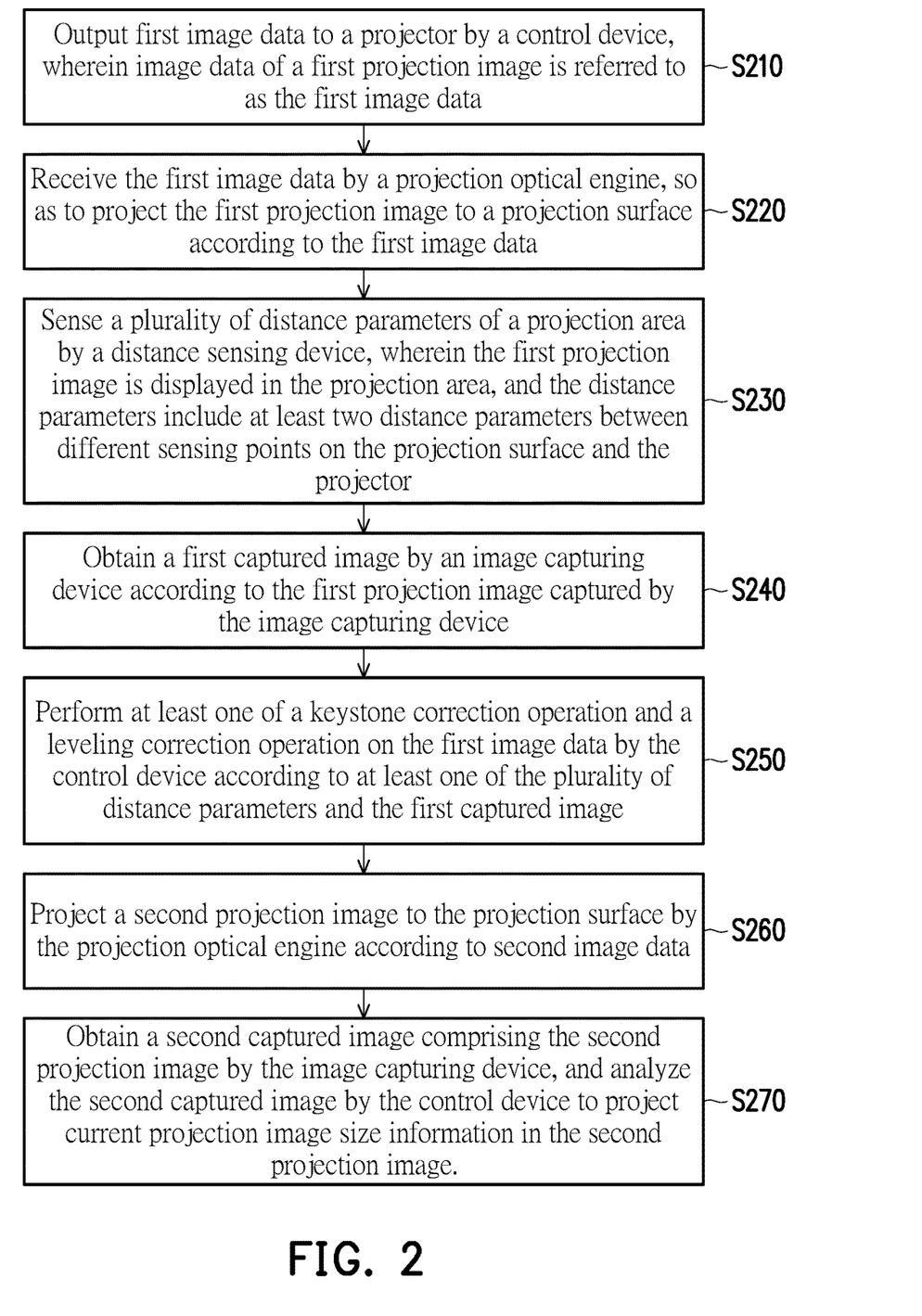
FIG. 2 is a flowchart of a projection method according to an embodiment of the invention.

FIG. 2 is a flowchart of a projection method according to an embodiment of the invention. Referring to FIG. 1 and FIG. 2, the projector 100 may execute following steps S210-S270 to achieve a good projection effect, which allows the user to clearly know the size information of the projection image projected by the projector 100 after the automatic image correction. In the embodiment, in step S210, first image data is output to the projection optical engine 140 by the control device 110, where image data of the first projection image 101 is referred to as the first image data. In step S220, the first image data is received by the projection optical engine 140, and the first projection image 101 is projected to the projection surface S1 according to the first image data. In the embodiment, the image processor 112 may output the first image data to the projection optical engine 140. In step S230, a plurality of distance parameters of the projection area are sensed by the distance sensing device 120, and the first projection image is displayed in the projection area, where the plurality of distance parameters include distance parameters between at least two different sensing points on the projection surface S1 and the projector 100. In step S240, a first captured image is obtained by an image capturing device 130 according to the first projection image captured by the image capturing device 130. In step S250, the control device 110 performs at least one of a keystone correction operation and a leveling correction operation on the image data of the first projection image 101 according to at least one of the plurality of distance parameters and the first captured image. In the embodiment, the microcontroller 111 may analyze the plurality of distance parameters and the first captured image to determine whether the first projection image 101 has keystone distortion or whether partial image distortion of the first projection image 101 is generated due to that the projection surface S1 is in an uneven state, and may output a corresponding correction signal to the image processor 112, so that the image processor 112 may perform at least one of a keystone correction operation and a leveling correction operation on the first image data according to the correction signal to generate second image data, where the second image data is the corrected first image data. In the embodiment, the keystone correction operation includes correction of the image data in at least one of the horizontal direction and the vertical direction.

In step S260, the projection optical engine 140 projects a second projection image to the projection surface S1 according to the second image data, i.e., the second projection image is the corrected first projection image 101. In the embodiment, the image processor 112 outputs the second image data to the projection optical engine 140, and the projection optical engine 140 projects the second projection image according to the second image data. In addition, in an embodiment, the microcontroller 111 of the control device 110 may further determine whether the second projection image is clear, and analyze the imaging clarity of the first captured image to determine that a current focus of the projection optical engine is incorrect, so as to generate a focus adjustment signal for providing to the image processor 120, and the image processor 120 outputs focal length correction data corresponding to the focal length adjustment signal to the projection optical engine 140 to automatically adjust a focal length of a projection lens in the projection optical engine 140, so that the second projection image may present a clear image effect.

In step S270, a second captured image including the second projection image is obtained by the image capturing device 130, and the second captured image is analyzed by the control device 110 to project current size information of the second projection image in the second projection image. In the embodiment, the projector 100 may automatically sense a size of the projection image currently on the projection surface S1 and display the size information on the projection image to effectively inform the user of the size of the current projection image. Therefore, the projector 100 and the projection method of the embodiment may provide a good projection effect, and my allow the user to clearly know the size information of the projection image projected by the projector after the automatic image correction, so as to achieve a good user experience.

Figure 3:
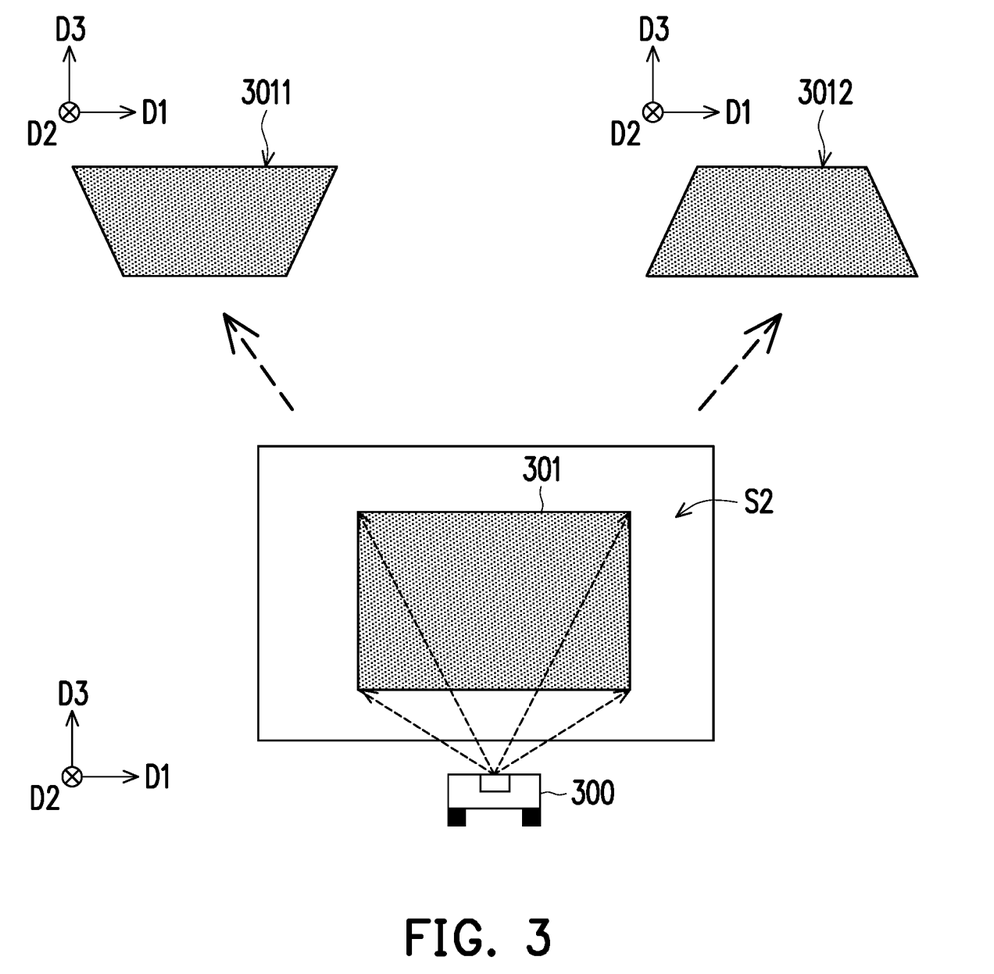
FIG. 3 is a schematic diagram of performing vertical keystone correction on a projection image according to an embodiment of the invention.

FIG. 3 is a schematic diagram of performing vertical keystone correction on a projection image according to an embodiment of the invention. Referring to FIG. 3, related hardware features and implementation of a projector 300 of the embodiment may be deduced by referring to the related descriptions of the projector 100 of the embodiment of FIG. 1 and FIG. 2, and details thereof are not repeated. In the embodiment, the projector 300 may project a first projection image 301 on a projection surface S2, and the projector 300 may obtain at least one of a plurality of distance parameters in the projection area and a first captured image corresponding to the first projection image 301. The control device of the projector 300 may determine keystone distortion of the first projection image 301 according to at least one of the plurality of distance parameters and the first captured image, and then correct the first image data through the image processor of the control device to generate the second image data, which is described in detail below.

The control device of the projector 300 obtains a first inclination angle between the projector 300 and the projection surface S2 in the vertical direction according to the plurality of distance parameters, and performs the keystone correction operation on the first image data according to the first inclination angle. The so-called first inclination angle is an angle between a plane of the projector 300 (a plane formed by the first direction D1 and the third direction D3) and the projection surface S2 in the vertical direction (D3).

It is should be noted that if the projector 300 and the projection surface S2 have the first inclination angle there between in the vertical direction, the first projection image 301 may be actually displayed on the projection surface S2 in an effect of a projection image 3011 or a projection image 3012. For example, the control device of the projector 300 may calculate the first inclination angle between the projector 300 and the projection surface S2 in the vertical direction according to changes of the plurality of distance parameters of the plurality of sensing points in the vertical direction in the projection area of the projection surface S2, and automatically perform vertical keystone correction.

When the control device of the projector 300 obtains the first captured image, the control device may analyze an included angle between a boundary of the first projection image in the vertical direction in the first captured image and a normal vertical line, so as to quickly and automatically perform the vertical keystone correction.

Therefore, the projector 300 of the embodiment may automatically perform the vertical keystone correction through one of the distance sensing device and the image capturing device. In addition, in another embodiment, the projector 300 may also obtain the first inclination angle in the vertical direction through a G-sensor, and is not limited to the above-mentioned distance sensing device and image capturing device.

Figure 4:
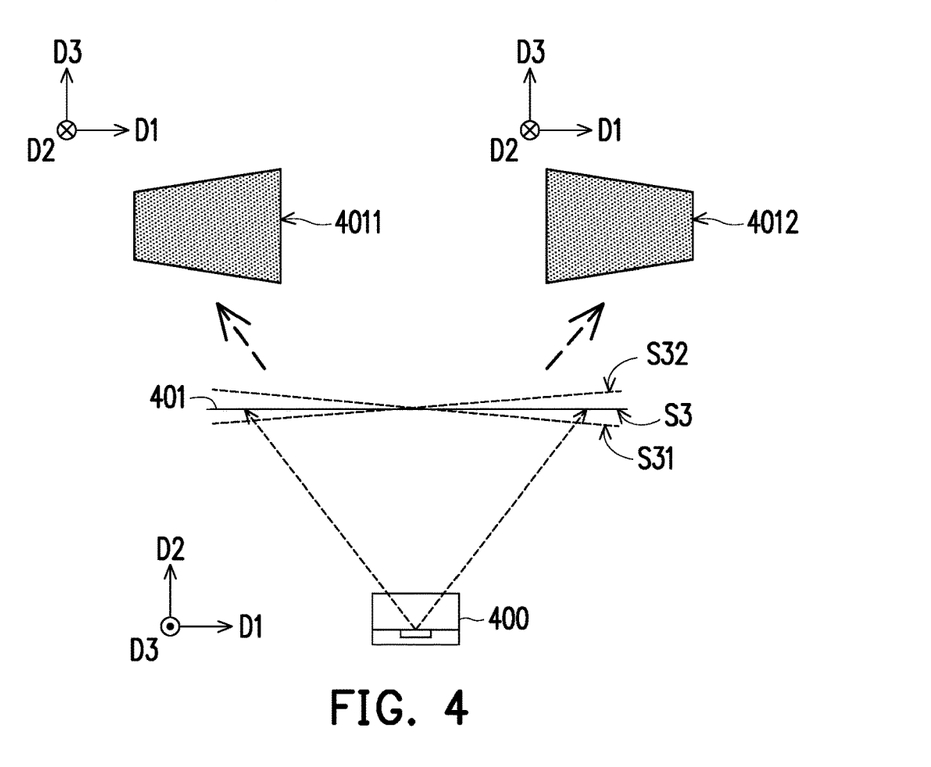
FIG. 4 is a schematic diagram of performing horizontal keystone correction on a projection image according to an embodiment of the invention.

FIG. 4 is a schematic diagram of performing horizontal keystone correction on a projection image according to an embodiment of the invention. Referring to FIG. 4, related hardware features and implementation of a projector 400 of the embodiment may be deduced by referring to the related descriptions of the projector 100 of the embodiment of FIG. 1 to FIG. 3, and details thereof are not repeated. In the embodiment, the projector 400 may project a first projection image 401 on a projection surface S3, and the projector 400 may obtain at least one of a plurality of distance parameters in the projection area and a first captured image corresponding to the first projection image 401. The control device of the projector 400 may determine keystone distortion of the first projection image 401 according to at least one of the plurality of distance parameters and the first captured image, and then correct the first image data through the image processor of the control device to generate the second image data, which is described in detail below.

The control device of the projector 400 obtains a second inclination angle between the projector 400 and the projection surface S3 in the horizontal direction according to the plurality of distance parameters, and performs the keystone correction operation on the first image data according to the second inclination angle.

The so-called second inclination angle is an angle between a plane of the projector 400 (a plane formed by the first direction D1 and the third direction D3) and the projection surface S3 in the horizontal direction (D1).

It is should be noted that if the projector 400 and the projection surface S3 have the second inclination angle there between in the horizontal direction, so that the projector 400 is equivalent to project onto a projection surface S31 or a projection surface S32, the first projection image may be actually displayed on the projection surface S3 in an effect of a projection image 4011 or a projection image 4012.

For example, the control device of the projector 400 may calculate the second inclination angle between the projector 400 and the projection surface S3 in the horizontal direction according to changes of the plurality of distance parameters of the plurality of sensing points in the horizontal direction in the projection area of the projection surface S3, and automatically perform horizontal keystone correction. Moreover, when the control device of the projector 400 obtains the first captured image, the control device may analyze an included angle between a boundary of the first projection image in the horizontal direction in the first captured image and a normal horizontal line, so as to quickly and automatically perform the horizontal keystone correction.

Therefore, the projector 400 of the embodiment may automatically perform the horizontal keystone correction through one of the distance sensing device and the image capturing device. Moreover, the horizontal keystone correction of the embodiment may be executed together with the vertical keystone correction described in the embodiment of FIG. 3.

Figure 5:
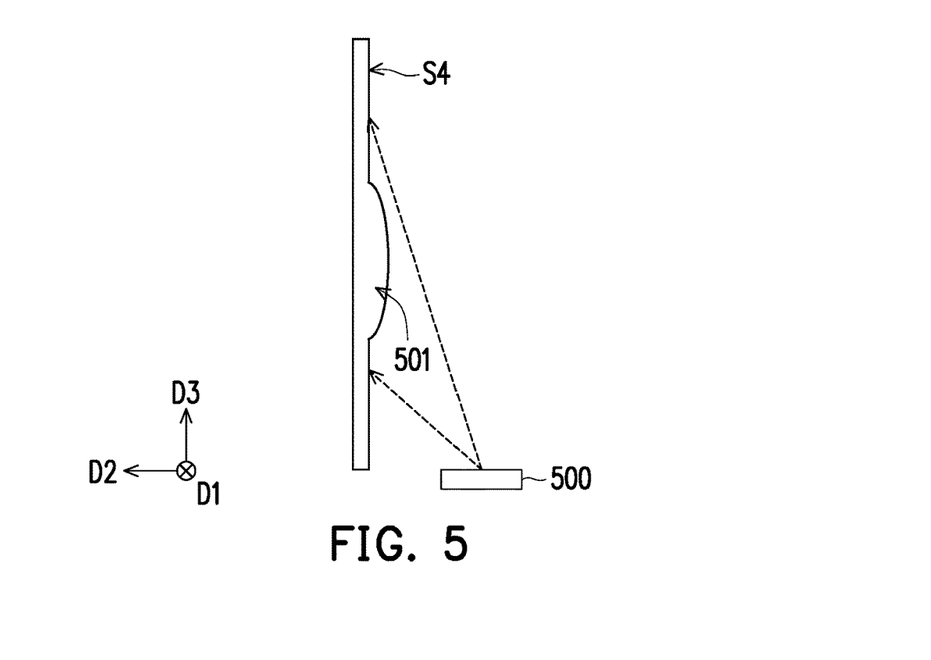
FIG. 5 is a schematic diagram of performing leveling correction on a projection image according to an embodiment of the invention.

FIG. 5 is a schematic diagram of performing leveling correction on a projection image according to an embodiment of the invention. Referring to FIG. 5, related hardware features and implementation of a projector 500 of the embodiment may be deduced by referring to the related descriptions of the projector 100 of the embodiments of FIG. 1 to FIG. 5, and details thereof are not repeated. In the embodiment, the projector 500 may project a first projection image on a projection surface S4. As shown in FIG. 5, if the projection surface S4 has an uneven area 501 (protrusion, depression or obstacle), the control device of the projector 500 obtains abnormal value changes of the first projection image on the uneven area 501, and compensates for the value changes to complete a leveling correction operation. In detail, the projector 500 determines whether a part of the projection surface S4 in the projection area is even or not by means of image analysis. For example, the first projection image projected by the projector 500 on the projection surface S4 may include a plurality of reference patterns arranged periodically (for example, a plurality of grid points arranged in an array and having fixed intervals), so that when the projector 500 determines that the areas in the projection area are uneven according to whether the intervals between the reference patterns in the first captured image obtained by the image capturing device are changed, the control device of the projector 500 achieves the leveling correction operation on the first image data by compensating for the changes of the interval between the reference patterns.

Figure 6:
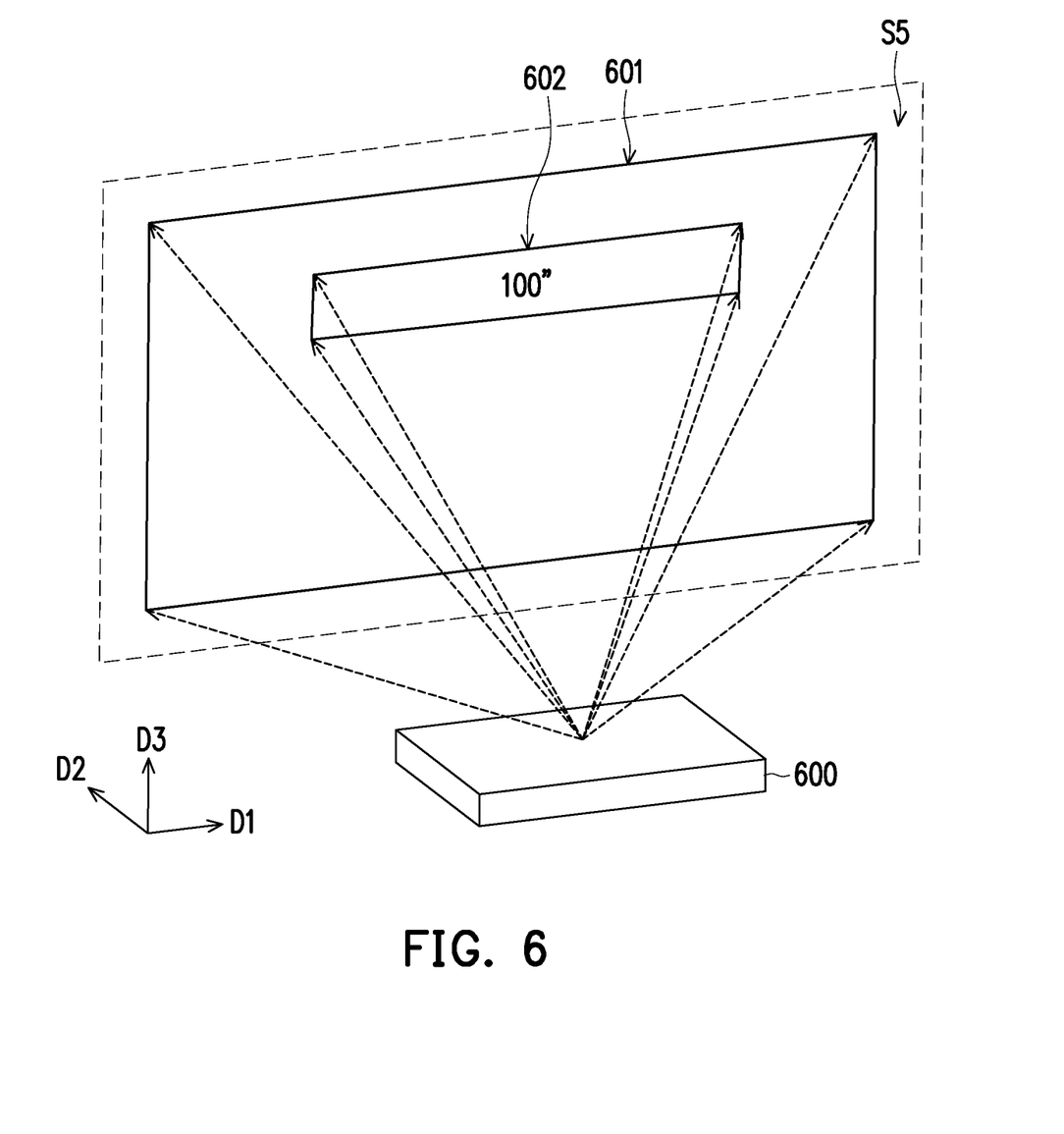
FIG. 6 is a schematic diagram of projecting projection image size information in a projection image according to an embodiment of the invention.

FIG. 6 is a schematic diagram of projecting projection image size information in a projection image according to an embodiment of the invention. Referring to FIG. 6, related hardware features and implementation of a projector 600 of the embodiment may be deduced by referring to the related descriptions of the projector 100 of the embodiments of FIG. 1 to FIG. 5, and details thereof are not repeated. In the embodiment, the projector 600 may project a second projection image 601 on a projection surface S5, where the second projection image 601 of the embodiment may be a projection result of the projection optical engine 140 according to the second projection data generated after the keystone correction and the leveling correction of at least one of the above-mentioned embodiments shown in FIG. 3 to FIG. 5. In the embodiment, the image capturing device of the projector 600 may obtain a second captured image including the second projection image 601, and the microcontroller of the projector 600 may analyze a size of the second captured image 601 to generate current second projection image size information. Then, the control device of the projector 600 may output the current projection image size information (the second projection image size information) to the projection optical engine, and the projection optical engine projects a sub-image 602 with the current projection image size information in the second projection image, for example, the displayed size information is 100".

In summary, the projector and the projection method of the invention may automatically perform the keystone correction operation and the leveling correction operation on image data, and may also automatically detect a size of the current projection image, so as to display the current projection image size information in the projection image, such that the user may conveniently operate the projector, and adjust a placement position of the projector according to the current projection image size information to achieve a projection image size required by the user.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
a control device, configured to output first image data;
a projection optical engine, coupled to the control device, configured to receive the first image data to project a first projection image to a projection surface according to the first image data;
a distance sensing device, coupled to the control device, configured to sense a plurality of distance parameters of a projection area, wherein the first projection image is displayed in the projection area; and
an image capturing device, coupled to the control device, configured to capture the first projection image to obtain a first captured image,
wherein the control device is configured to perform at least one of a keystone correction operation and a leveling correction operation on the first image data according to at least one of the distance parameters and the first captured image, and the projection optical engine projects a second projection image to the projection surface according to corrected first image data,
wherein the control device obtains a second captured image comprising the second projection image through the image capturing device, and analyzes the second captured image to project current projection image size information in the second projection image.

2. The projector as claimed in claim 1, wherein the control device comprises:
an image processor, coupled to the projection optical engine; and
a microcontroller, coupled to the distance sensing device, the image capturing device, and the image processor, configured to generate a correction signal according to at least one of the distance parameters and the first captured image and configured to output the correction signal to the image processor, so that the image processor performs at least one of the keystone correction operation and the leveling correction operation on the first image data according to the correction signal.

3. The projector as claimed in claim 2, wherein the microcontroller is further configured to analyze the second captured image to generate the current projection image size information, the control device outputs the current projection image size information to the projection optical engine, so that the projection optical engine displays the current projection image size information in the second projection image.

4. The projector as claimed in claim 1, wherein the keystone correction operation comprises performing keystone correction on the first image data in at least one of a horizontal direction and a vertical direction.

5. The projector as claimed in claim 4, wherein the control device obtains at least one of a first inclination angle in the vertical direction and a second inclination angle in the horizontal direction between the projector and the projection surface according to at least one of the distance parameters and the first captured image, and performs the keystone correction operation on the first image data according to at least one of the first inclination angle and the second inclination angle.

6. The projector as claimed in claim 1, wherein a sensing range of the distance sensing device on the projection surface covers the projection area, and the control device determines whether the projection surface is even in the projection area according to the distance parameters, so as to determine whether to perform the leveling correction operation on the first image data.

7. The projector as claimed in claim 1, wherein the first projection image comprises a plurality of reference patterns arranged periodically, and wherein the control device is configured to analyze an interval change between the reference patterns to determine whether to perform the leveling correction operation on the first image data.

8. The projector as claimed in claim 1, wherein the distance sensing device comprises:
an infrared light source, coupled to the control device, configured to emit a plurality of infrared rays toward at least one image area of the first projection image on the projection surface; and
at least one time of flight ranging sensor, coupled to the control device, configured to sense a plurality of reflected infrared rays reflected by the projection surface to output the distance parameters to the control device.

9. The projector as claimed in claim 1, wherein the control device is further configured to determine whether the second projection image is clear to output focal length correction data to the projection optical engine, and the projection optical engine automatically adjusts a focal length.

10. The projector as claimed in claim 1, wherein the projector is an ultra-short throw projector.

11. A projection method, comprising:
outputting first image data by a control device;
receiving the first image data by a projection optical engine, so as to project a first projection image to a projection surface according to the first image data;
sensing a plurality of distance parameters of a projection area by a distance sensing device, wherein the first projection image is displayed in the projection area;
capturing the first projection image to obtain a first captured image by an image capturing device;
performing at least one of a keystone correction operation and a leveling correction operation on the first image data by the control device according to at least one of the plurality of distance parameters and the first captured image;
projecting a second projection image to the projection surface by the projection optical engine according to corrected first image data; and
obtaining a second captured image comprising the second projection image by the image capturing device, and analyzing the second captured image by the control device to project current projection image size information in the second projection image.

12. The projection method as claimed in claim 11, wherein the control device further comprises a microcontroller and an image processor, and performing at least one of the keystone correction operation and the leveling correction operation on the first image data by the control device according to at least one of the plurality of distance parameters and the first captured image comprises:
generating a correction signal by the microcontroller according to the distance parameters and the first captured image, and outputting the correction signal to the image processor;
performing the keystone correction operation and the leveling correction operation on the first image data by the image processor according to the correction signal; and
providing the corrected first image data to the projection optical engine by the image processor.

13. The projection method as claimed in claim 12, further comprising:
analyzing the second captured image by the microcontroller to generate the current projection image size information and outputting the current projection image size information to the projection optical engine; and
displaying the current projection image size information in the second projection image by the projection optical engine.

14. The projection method as claimed in claim 11, wherein the keystone correction operation comprises performing keystone correction on the first image data in at least one of a horizontal direction and a vertical direction.

15. The projection method as claimed in claim 14, wherein the keystone correction operation comprises:
obtaining at least one of a first inclination angle in the vertical direction and a second inclination angle in the horizontal direction between the projector and the projection surface by the control device according to at least one of the distance parameters and the first captured image; and
performing the keystone correction operation on the image data according to at least one of the first inclination angle and the second inclination angle.

16. The projection method as claimed in claim 11, wherein a sensing range of the distance sensing device on the projection surface covers the projection area, and the leveling correction operation comprises:
determining whether the projection surface is even in the projection area by the control device according to the distance parameters, so as to determine whether to perform the leveling correction operation on the first image data.

17. The projection method as claimed in claim 11, wherein the first projection image comprises a plurality of reference patterns arranged periodically, and the leveling correction operation comprises:
analyzing an interval change between the reference patterns by the control device to determine whether to perform the leveling correction operation on the first image data.

18. The projection method as claimed in claim 11, wherein the distance sensing device comprises an infrared light source and at least one time of flight ranging sensor, and sensing the distance parameters of the projection area by the distance sensing device comprises:

emitting a plurality of infrared rays toward at least one image area of the first projection image on the projection surface by the infrared light source; and sensing a plurality of reflected infrared rays reflected by the projection surface by the at least one time of flight ranging sensor, so as to output the distance parameters to the control device.

19. The projection method as claimed in claim 11, further comprising:

determining whether the second projection image is clear by the control device to output focal length correction data to the projection optical engine, so that the projection optical engine automatically adjusts a focal length.

20. The projection method as claimed in claim 11, wherein the projector is an ultra-short throw projector.

* * * * *